United States Patent
Chen et al.

(10) Patent No.: US 8,780,005 B2
(45) Date of Patent: Jul. 15, 2014

(54) WIRELESS SECURITY DEVICE

(75) Inventors: Cheng-Wei Chen, New Taipei (TW);
Hsiao-Pin Liang, Taichung (TW);
Dau-Chyrh Chang, Taipei (TW)

(73) Assignee: Climax Technology Co., Ltd., Taipei (TW)

( * ) Notice: Subject to any disclaimer, the term of this patent is extended or adjusted under 35 U.S.C. 154(b) by 218 days.

(21) Appl. No.: 13/570,437

(22) Filed: Aug. 9, 2012

(65) Prior Publication Data
US 2013/0257671 A1  Oct. 3, 2013

(30) Foreign Application Priority Data
Mar. 27, 2012  (TW) .............................. 101110506 A

(51) Int. Cl.
*H01Q 1/52* (2006.01)
*H01Q 1/24* (2006.01)
(52) U.S. Cl.
CPC . *H01Q 1/52* (2013.01); *H01Q 1/243* (2013.01)
USPC .......................................... 343/841; 343/702
(58) Field of Classification Search
CPC ........... H01Q 1/52; H01Q 1/243; H01Q 9/04; H04B 15/04; H04B 1/38
USPC ................... 343/841, 702, 700 MS, 846, 848
See application file for complete search history.

(56) References Cited

U.S. PATENT DOCUMENTS

| | | | | |
|---|---|---|---|---|
| 6,867,746 B2 * | 3/2005 | Mendolia et al. | ............. | 343/841 |
| 7,609,221 B2 * | 10/2009 | Chung et al. | .................. | 343/841 |
| 7,932,864 B2 * | 4/2011 | Zhu et al. | ...................... | 343/702 |
| 8,384,604 B2 * | 2/2013 | Niederkorn et al. | .......... | 343/702 |

OTHER PUBLICATIONS

Chen, C.W., et al.; "Reduction of EMI due to Antenna Radiation inside Complex PCB;" PIERS Proceedings; Mar. 2012; pp. 1610-1614.

* cited by examiner

*Primary Examiner* — Hoang V Nguyen
(74) *Attorney, Agent, or Firm* — McClure, Qualey & Rodack, LLP

(57) ABSTRACT

A wireless security device includes a nonconductive housing, a mother circuit board, a wireless expansion card, and a metal reflector. The mother circuit board and the wireless expansion card are disposed in the nonconductive housing. The mother circuit board includes a processor. The wireless expansion card includes a dielectric substrate, a ground plane, an inverted-F antenna, and an RF (radio frequency) module. The metal reflector is positioned between the mother circuit board and the wireless expansion card, and is close to the inverted-F antenna. The metal reflector is configured to reduce EMI (Electromagnetic Interference) from the mother circuit board so as to maintain performance of the inverted-F antenna.

17 Claims, 10 Drawing Sheets

WIRELESS SECURITY DEVICE

CROSS REFERENCE TO RELATED APPLICATIONS

This application claims priority of Taiwan Patent Application No. 101110506 filed on Mar. 27, 2012, the entirety of which is incorporated by reference herein.

BACKGROUND OF THE INVENTION

1. Field of the Invention

The disclosure generally relates to a wireless security device, and more particularly, relates to a wireless security device for reducing EMI (Electromagnetic Interference) and maintaining antenna performance.

2. Description of the Related Art

EMI (Electromagnetic Interference) is defined as any electromagnetic occurrence which degrades performance of apparatuses, equipments and systems, or damages lives and inanimate objects. EMI may result from electromagnetic noise, useless signals, or changes in transmission media. Leakage radiation from transmission media is caused by energy of high frequency waves and signal modulation.

For example, an antenna in an electronic communication device is usually affected by electromagnetic waves from other electronic components, thereby reducing communication quality.

BRIEF SUMMARY OF THE INVENTION

In one exemplary embodiment, the disclosure is directed to a wireless security device, comprising: a nonconductive housing; a mother circuit board, disposed in the nonconductive housing, and comprising a processor; a wireless expansion card, disposed in the nonconductive housing, and comprising: a dielectric substrate; a ground plane, disposed on a surface of the dielectric substrate; an inverted-F antenna, disposed on the surface of the dielectric substrate, and coupled to the ground plane; and an RF (Radio Frequency) module, coupled to the inverted-F antenna, and coupled to the processor; and a metal reflector, positioned between the mother circuit board and the wireless expansion card, close to the inverted-F antenna, and configured to reduce EMI (Electromagnetic Interference) from the mother circuit board so as to maintain performance of the inverted-F antenna.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
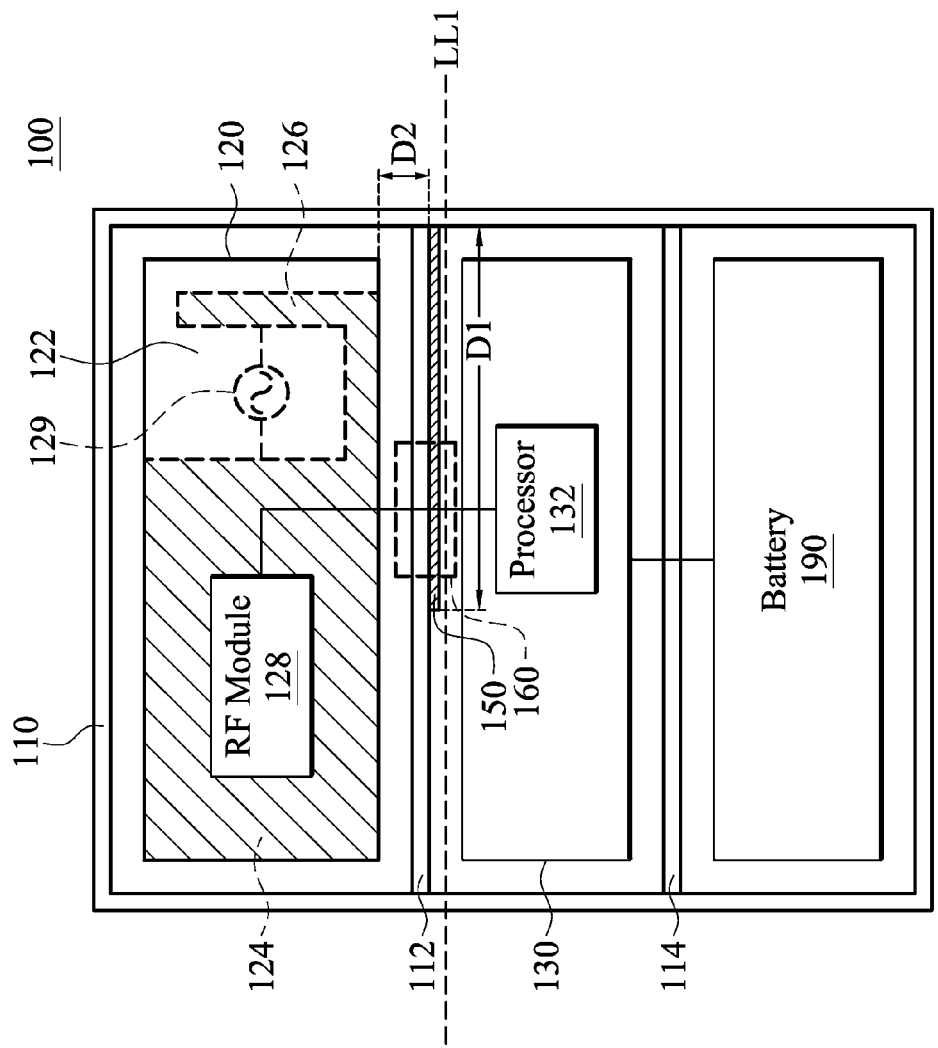
FIG. 1A is a vertical view for illustrating a wireless security device according to an embodiment of the invention.

FIG. 1A is a vertical view for illustrating a wireless security device 100 according to an embodiment of the invention. The wireless security device 100 may be applied to a wireless home security system. The wireless home security system comprises one or more sensors (not shown), the wireless security device 100, and a remote controller (not shown). The wireless security device 100 is configured to receive data obtained by the sensors (e.g., image data or audio data) and configured to adjust functions of the sensors according to a control signal generated by the remote controller.

As shown in FIG. 1A, the wireless security device 100 comprises a nonconductive housing 110, a wireless expansion card 120, a mother circuit board 130, a metal reflector 150, and a battery 190. The nonconductive housing 110 may be made of plastic material, such as ABS (Acrylonitrile Butadiene Styrene). The wireless expansion card 120, the mother circuit board 130, the metal reflector 150, and the battery 190 are all disposed in the nonconductive housing 110. The nonconductive housing 110 comprises nonconductive partitions 112 and 114. The nonconductive partition 112 substantially separates the mother circuit board 130 from the wireless expansion card 120, and the nonconductive partition 114 substantially separates the mother circuit board 130 from the battery 190.

The mother circuit board 130 comprises a processor 132 for processing a signal received by the wireless expansion card 120 and for executing main functions of the wireless security device 100. The wireless expansion card 120 comprises a dielectric substrate 122, a ground plane 124, an inverted-F antenna 126, and an RF (Radio Frequency) module 128. In some embodiments, the inverted-F antenna 126 is replaced with a monopole antenna, a loop antenna, or a chip antenna. The ground plane 124 and the inverted-F antenna 126 may be disposed on a lower surface of the dielectric substrate 122, and the inverted-F antenna 126 may be electrically coupled to the ground plane 124. The RF module 128 may be disposed on an upper surface of the dielectric substrate 122 and electrically coupled to the inverted-F antenna 126. In another embodiment, the ground plane 124 and the inverted-F antenna 126 are both disposed on the upper surface of the dielectric substrate 122. The signal source 129 is electrically coupled between the inverted-F antenna 126 and the ground plane 124 so as to excite the inverted-F antenna 126. The RF module 128 is further electrically coupled through a parallel pin connector 160 to the processor 132 of the mother circuit board 130.

The metal reflector 150 is positioned between the mother circuit board 130 and the wireless expansion card 150 and is close to the inverted-F antenna 126. The metal reflector 150 is configured to reduce EMI (Electromagnetic Interference) from the mother circuit board 130 (e.g., electromagnetic waves generated by the processor 132 or other noise) so as to maintain performance of the inverted-F antenna 126. The metal reflector 150 may be made of copper. In a preferred embodiment, the length D1 of the metal reflector 150 is greater than 0.5 wavelength (λ/2) of a central operating frequency of the inverted-F antenna 126, and the distance D2 between the metal reflector 150 and the inverted-F antenna 126 is approximately equal to 0.125 wavelength (λ/8) of the central operating frequency of the inverted-F antenna 126.

Figure 1B:
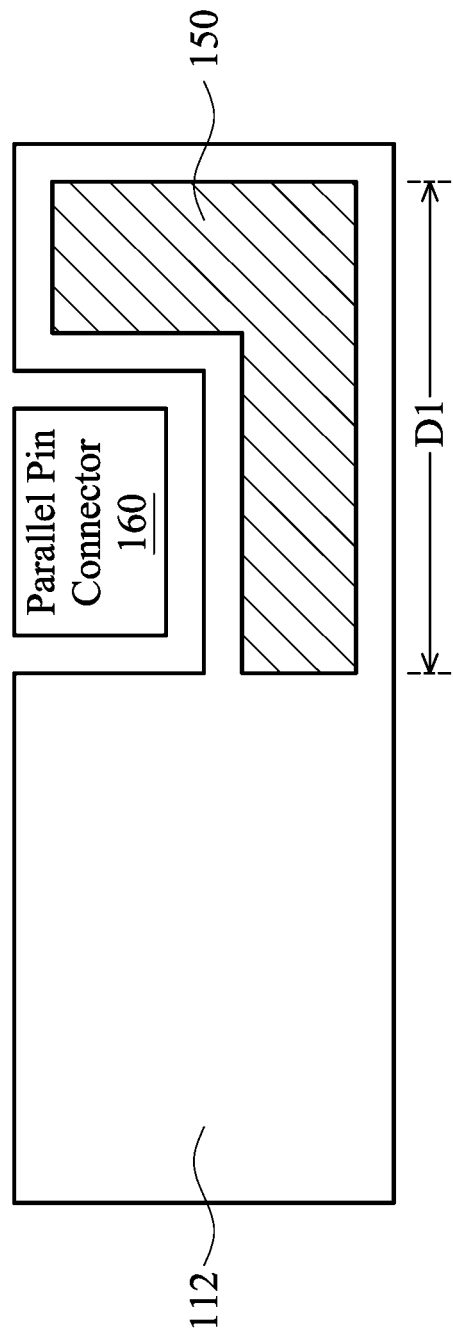
FIG. 1B is a side view along a line LL1 for illustrating the wireless security device according to an embodiment of the invention.

FIG. 1B is a side view along a line LL1 for illustrating the wireless security device 100 according to an embodiment of the invention. As shown in FIG. 1B, the metal reflector 150 is disposed on the nonconductive partition 112 and substantially has an L-shape. The wireless expansion card 120 is electrically coupled through the parallel pin connector 160 to the mother circuit board 130. In the embodiment, the parallel pin connector 160 and the metal reflector 150 substantially form a rectangular shape. Since the parallel pin connector 160 is made of metal, the parallel pin connector 160 is also capable of rejecting noise from the mother circuit board 130. In other embodiments, the metal reflector 150 has other shapes, such as a rectangular shape or a C-shape.

Figure 2A:
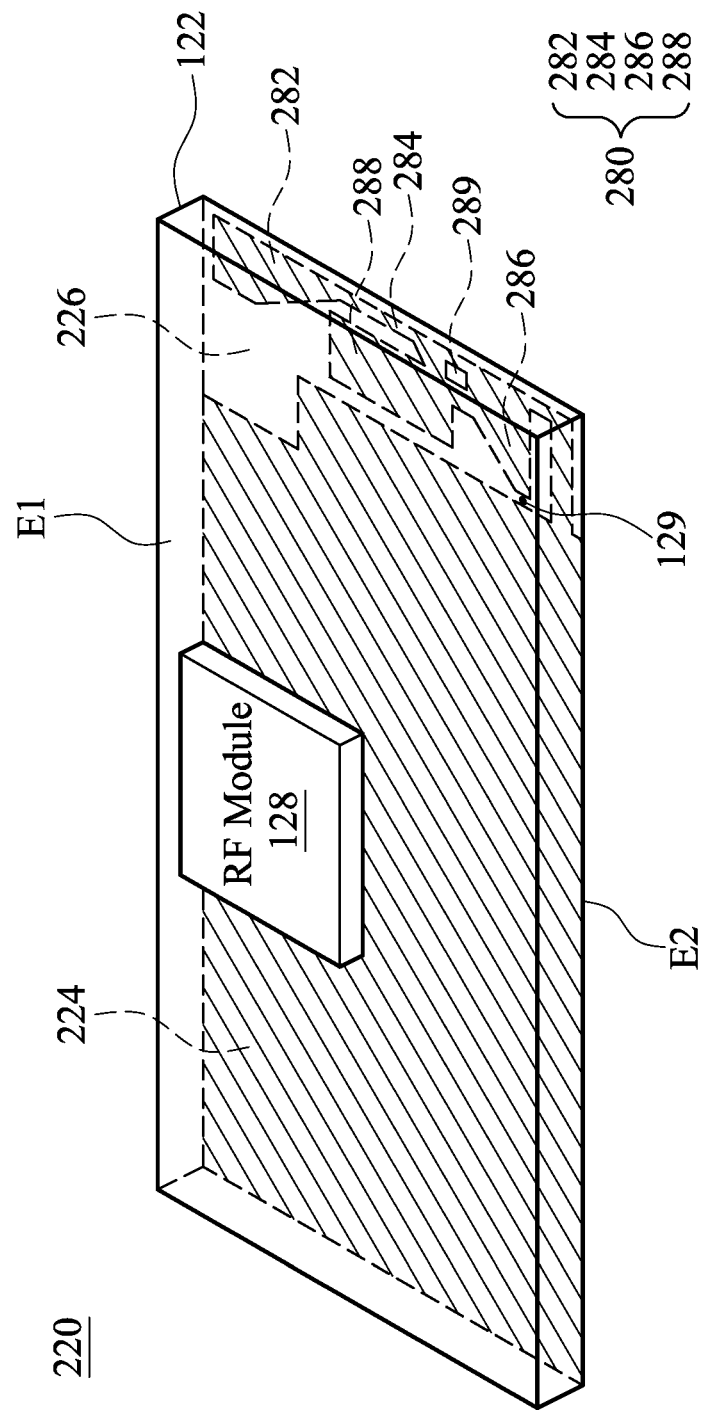
FIG. 2A is a pictorial drawing for illustrating a wireless expansion card according to an embodiment of the invention.

FIG. 2A is a pictorial drawing for illustrating a wireless expansion card 220 according to an embodiment of the invention. In a preferred embodiment, the wireless expansion card 220 replaces the wireless expansion card 120 as shown in FIGS. 1A and 1B. As shown in FIG. 2A, the wireless expansion card 220 comprises a dielectric substrate 122, a ground plane 224, an inverted-F antenna 280, and an RF module 128. The ground plane 224 and the inverted-F antenna 280 are disposed on a surface E2 of the dielectric substrate 122, and the RF module 128 is disposed on another surface E1 of the dielectric substrate 122. The dielectric substrate 122 may be an FR4 substrate. The ground plane 224 and the inverted-F antenna 280 are made of metal, such as silver or copper.

Figure 2B:
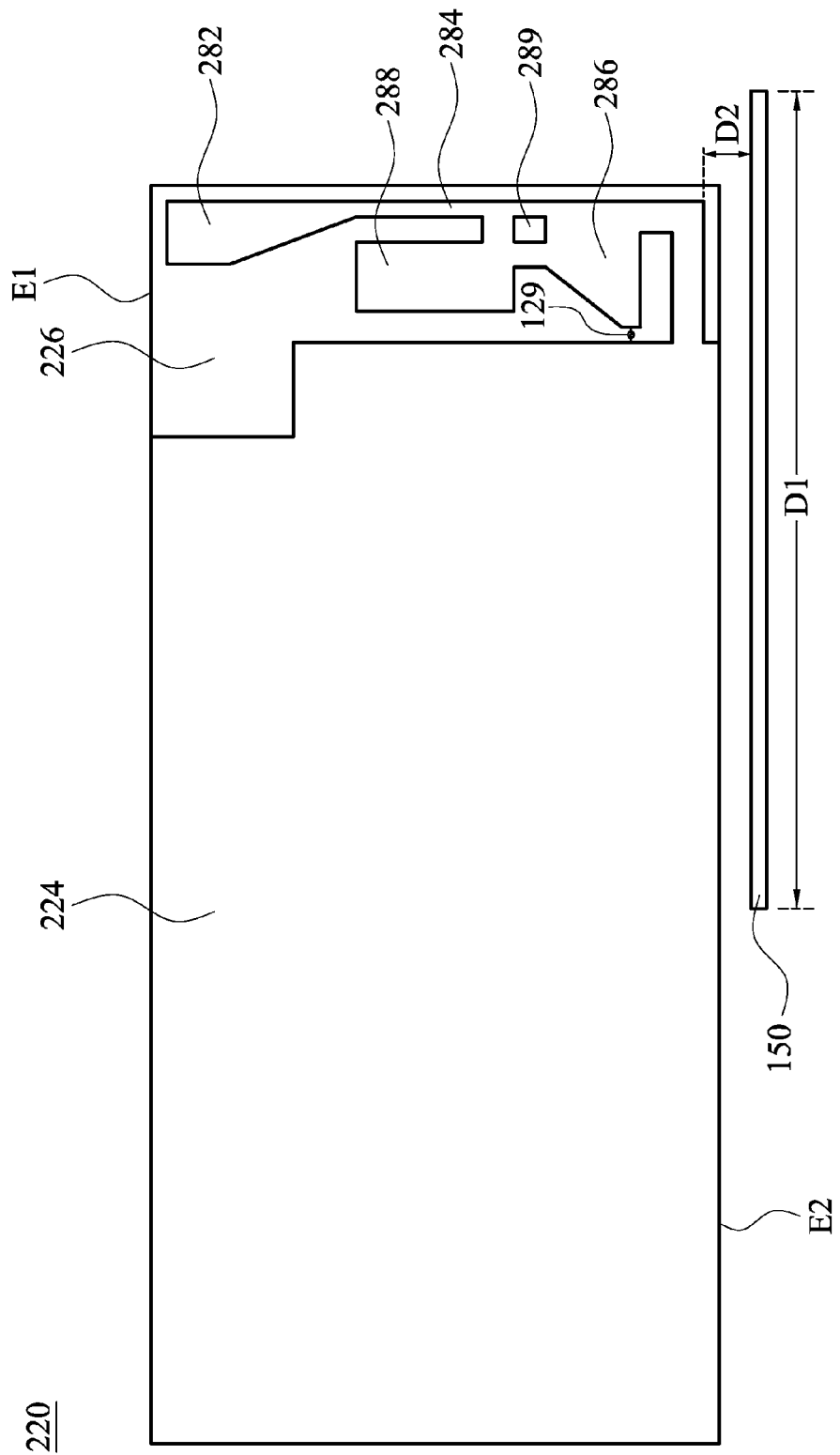
FIG. 2B is a vertical view for illustrating a surface of the wireless expansion card according to an embodiment of the invention.

FIG. 2B is a vertical view for illustrating the surface E2 of the wireless expansion card 220 according to an embodiment of the invention. As shown in FIGS. 2A and 2B, the inverted-F antenna 280 comprises a taper element 282, a main branch 284, a feeding element 286, and an extension element 288. The taper element 282 has a narrow end and a wide end. One end of the main branch 284 is electrically coupled to the ground plane 224, and the other end of the main branch 284 is electrically coupled to the narrow end of the taper element 282. The feeding element 286 is electrically coupled to a side of the main branch 284. A signal source 129 is electrically coupled between the ground plane 224 and the feeding element 286 to excite the inverted-F antenna 280. The extension element 288 is electrically coupled to the side of the main branch 284. The inverted-F antenna 280 further has a small hole 289 which is surrounded by the main branch 284, the feeding element 286, and the extension element 288. The small hole 289 is formed to provide different current paths to increase bandwidth of the inverted-F antenna 280. In a preferred embodiment, the main branch 284 substantially has an L-shape, the feeding element 286 substantially has a triangular shape, and the extension element 288 substantially has a rectangular shape. The foregoing elements may have other shapes to adjust frequency bands and to match impedance. In addition, the ground plane 224 may have a corner notch 226 which is close to the taper element 282 to reduce signal coupling. In the embodiment, the taper element 282, the feeding element 286, and the extension element 288 are all designed to be wider to increase bandwidth of the inverted-F antenna 280.

Figure 3:
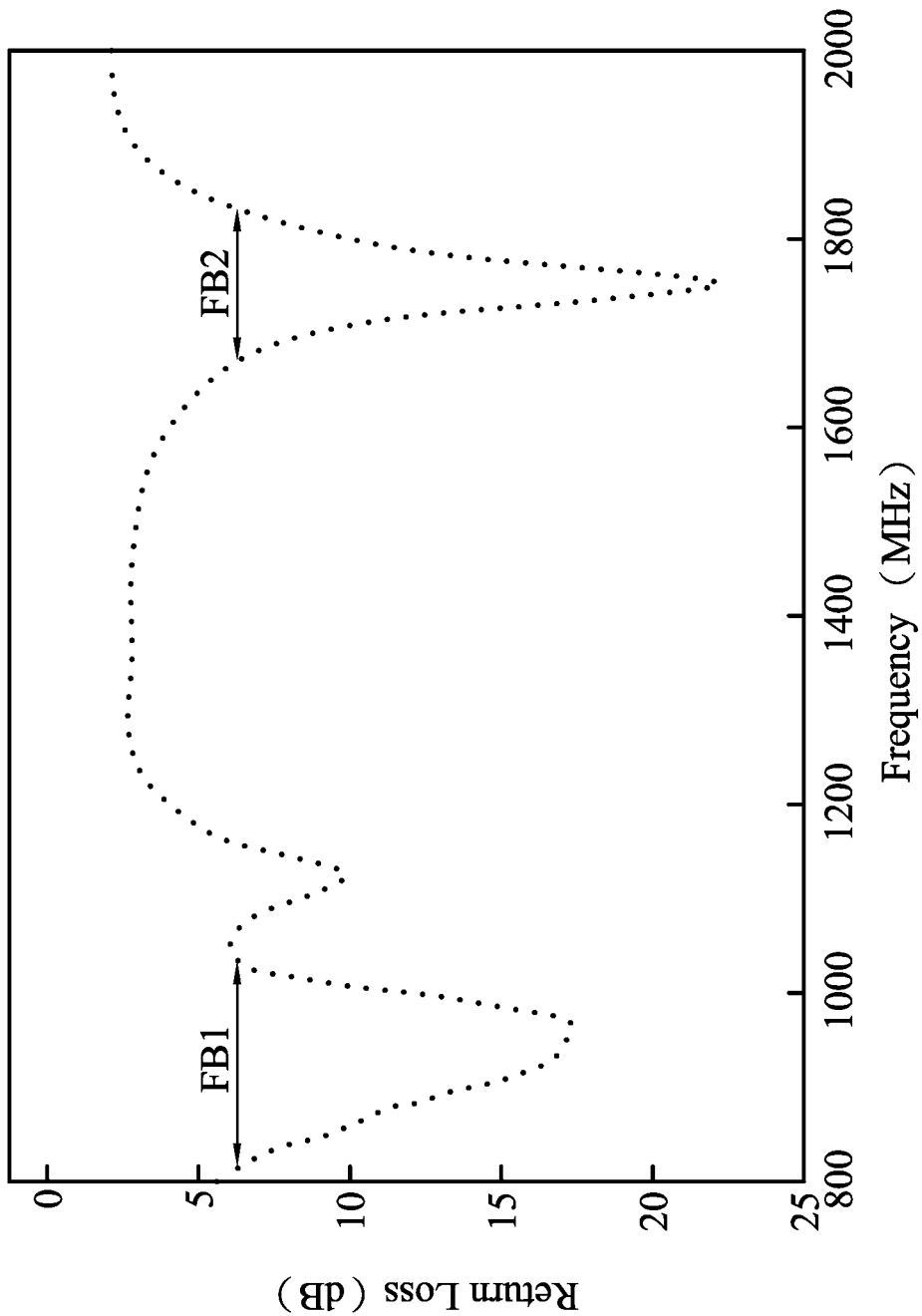
FIG. 3 is a diagram for illustrating return loss of an inverted-F antenna according to an embodiment of the invention.

FIG. 3 is a diagram for illustrating return loss of the inverted-F antenna 280 according to an embodiment of the invention. The vertical axis represents return loss (unit: dB), and the horizontal axis represents operation frequency (unit: MHz). In the inverted-F antenna 280, the feeding element 286, a portion of the main branch 284, and the taper element 282 are excited to form a frequency band FB1. Furthermore, the feeding element 286 and the extension element 288 are excited to form another frequency band FB2. In a preferred embodiment, the frequency band FB1 is approximately from 880 MHz to 960 MHz, and the frequency band FB2 is approximately from 1710 MHz to 1880 MHz. Therefore, the inverted-F antenna of the invention is capable of covering at least EGSM900 and DCS1800 bands.

In an embodiment, the elements in the invention have sizes and parameters as follows. The ground plane 224 has a length of about 126 mm and has a width of about 60 mm. The length D1 of the metal reflector 150 is about 100 mm. The distance D2 between the metal reflector 150 and the inverted-F antenna 280 (or 126) is about 10 mm. The total length of the main branch 284 and the taper element 282 is about 71 mm. The extension element 288 has a length of about 18 mm and has a width of about 8 mm. The dielectric substrate 122 has a dielectric constant of about 4.4 and has a thickness of about 1.6 mm. Note that the foregoing sizes and parameters are tunable according to desired frequency bands.

Figure 4:
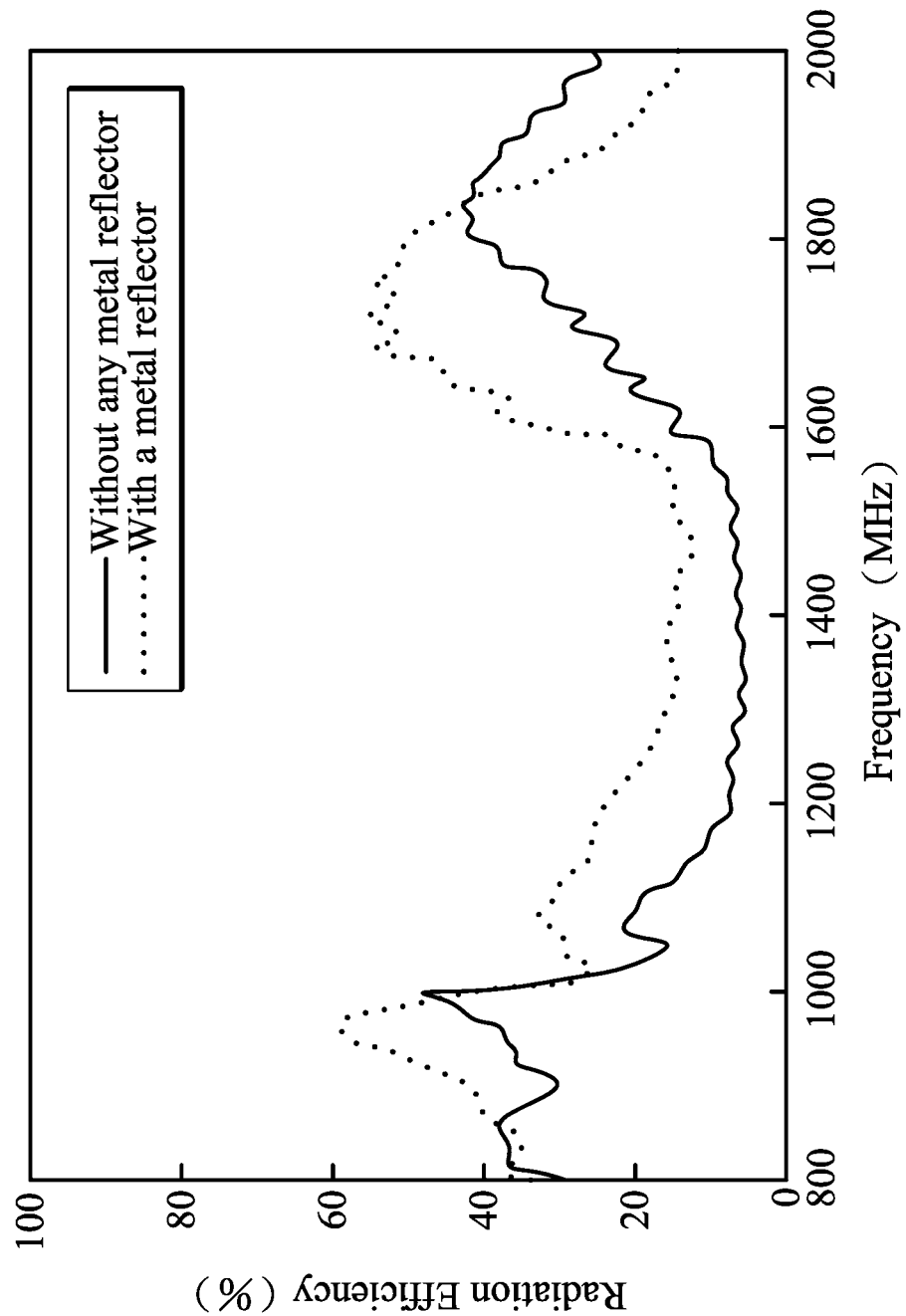
FIG. 4 is a diagram for illustrating radiation efficiency in which the inverted-F antenna with the metal reflector is compared to an inverted-F antenna without any metal reflector according to an embodiment of the invention.

FIG. 4 is a diagram for illustrating radiation efficiency in which the inverted-F antenna 280 with the metal reflector 150 is compared to an inverted-F antenna without any metal reflector according to an embodiment of the invention. The vertical axis represents radiation efficiency (%), and the horizontal axis represents operation frequency (MHz). As shown in FIG. 4, the inverted-F antenna 280 with the metal reflector 150 in the invention can increase radiation efficiency by 20% in EGSM900 and DCS1800 bands.

Figure 5:
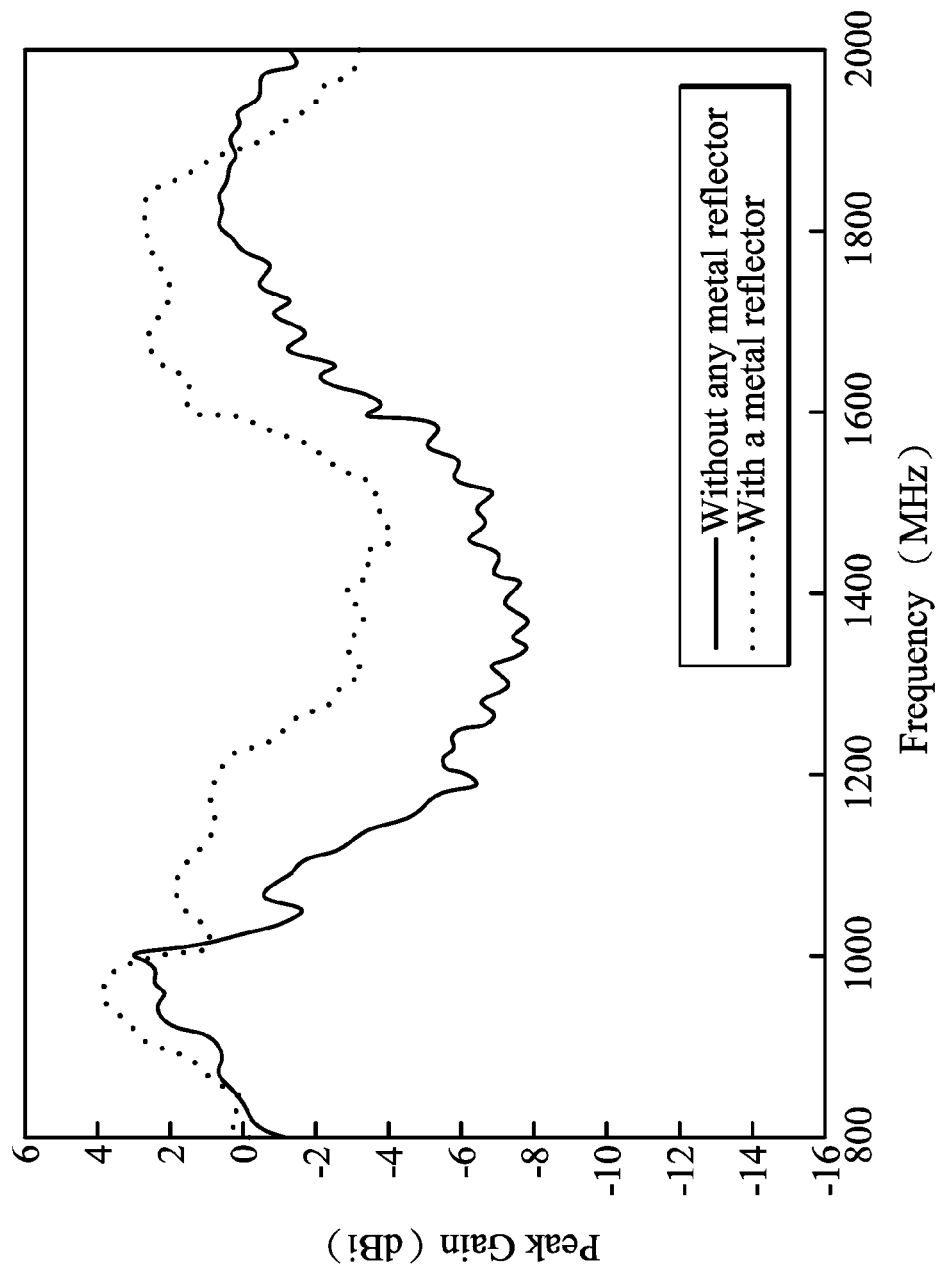
FIG. 5 is a diagram for illustrating peak gain in which the inverted-F antenna with the metal reflector is compared to an inverted-F antenna without any metal reflector according to an embodiment of the invention.

FIG. 5 is a diagram for illustrating peak gain in which the inverted-F antenna 280 with the metal reflector 150 is compared to an inverted-F antenna without any metal reflector according to an embodiment of the invention. The vertical axis represents peak gain (dBi), and the horizontal axis represents operation frequency (MHz). As shown in FIG. 5, the inverted-F antenna 280 with the metal reflector 150 in the invention can increase peak gain by 2 dBi in EGSM900 and DCS1800 bands.

Figure 6A:
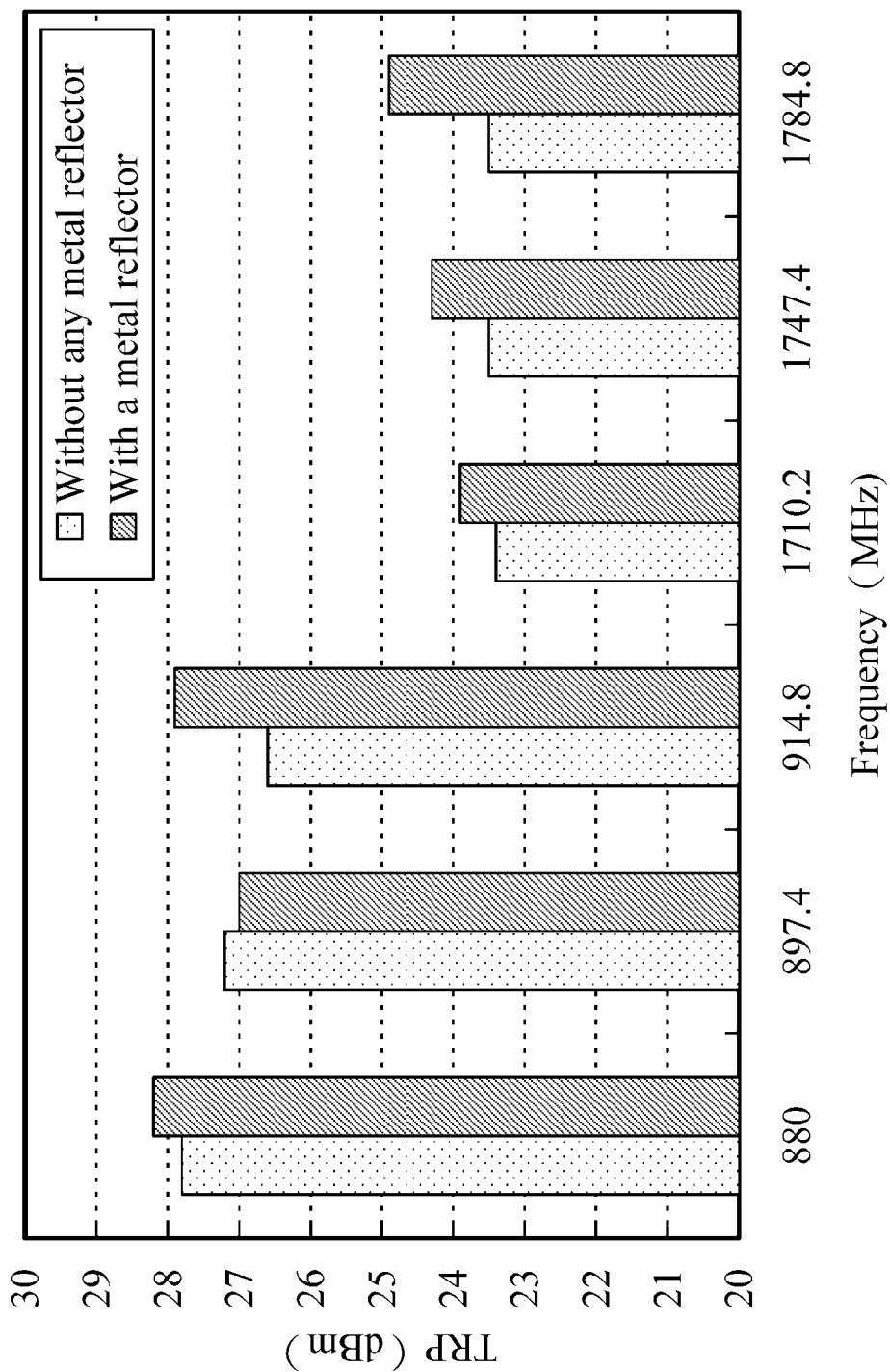
FIG. 6A is a diagram for illustrating TRP (Total Radiated Power) in which the inverted-F antenna with the metal reflector is compared to an inverted-F antenna without any metal reflector according to an embodiment of the invention.

FIG. 6A is a diagram for illustrating TRP (Total Radiated Power) in which the inverted-F antenna 280 with the metal reflector 150 is compared to an inverted-F antenna without any metal reflector according to an embodiment of the invention. The vertical axis represents TRP (dBm), and the horizontal axis represents operation frequency (MHz). As shown in FIG. 5, the inverted-F antenna 280 with the metal reflector 150 in the invention can effectively increase TRP at every sampled frequency.

Figure 6B:
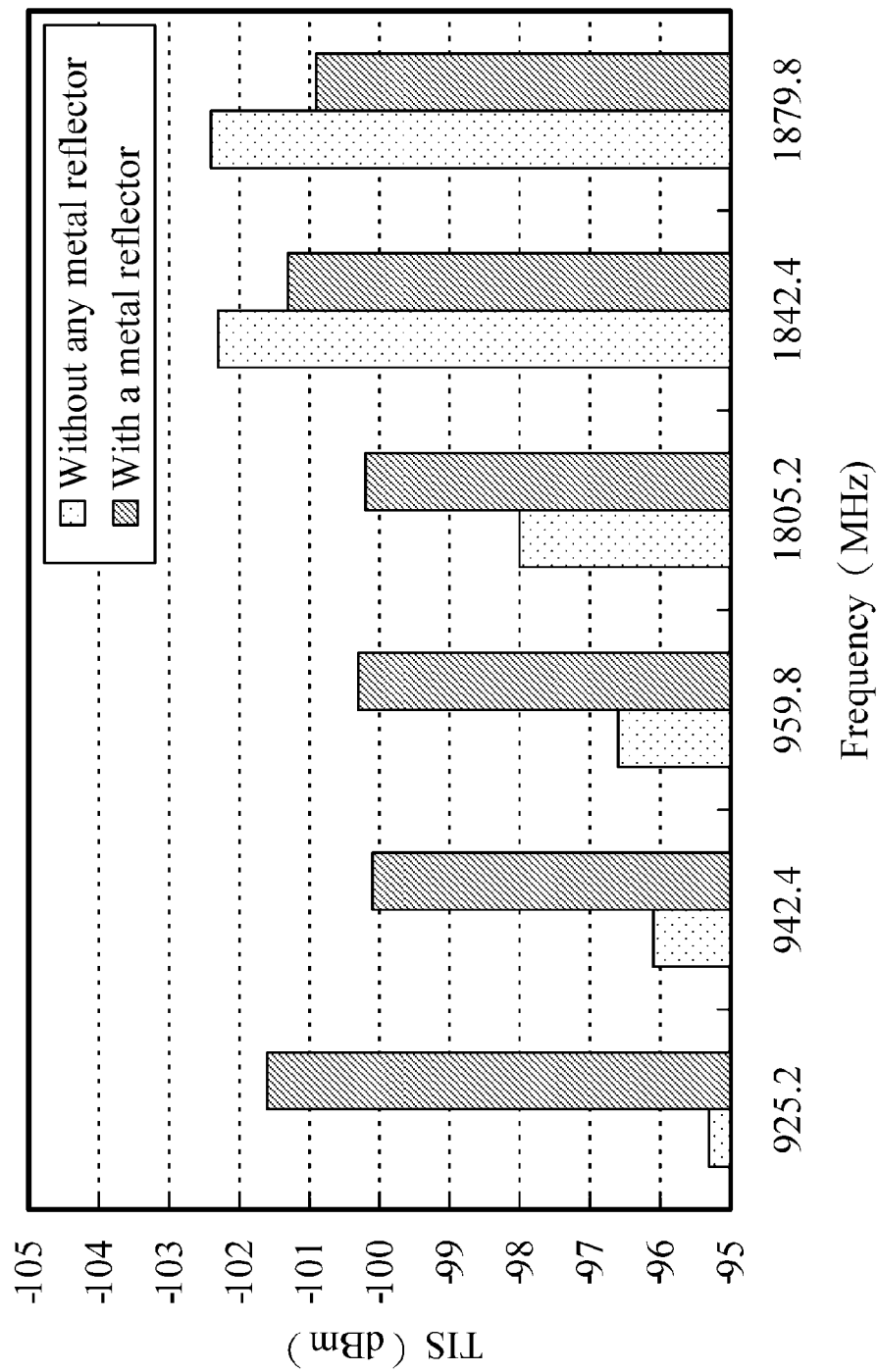
FIG. 6B is a diagram for illustrating TIS (Total Isotropic Sensitivity) in which the inverted-F antenna with the metal reflector is compared to an inverted-F antenna without any metal reflector according to an embodiment of the invention.

FIG. 6B is a diagram for illustrating TIS (Total Isotropic Sensitivity) in which the inverted-F antenna 280 with the metal reflector 150 is compared to an inverted-F antenna without any metal reflector according to an embodiment of the invention. The vertical axis represents TIS (dBm), and the horizontal axis represents operation frequency (MHz). Note that in the figure every number of the vertical axis has a minus. As shown in FIG. 6B, the inverted-F antenna 280 with the metal reflector 150 in the invention can effectively receive signals with low energy at every sampled frequency.

Figure 7:
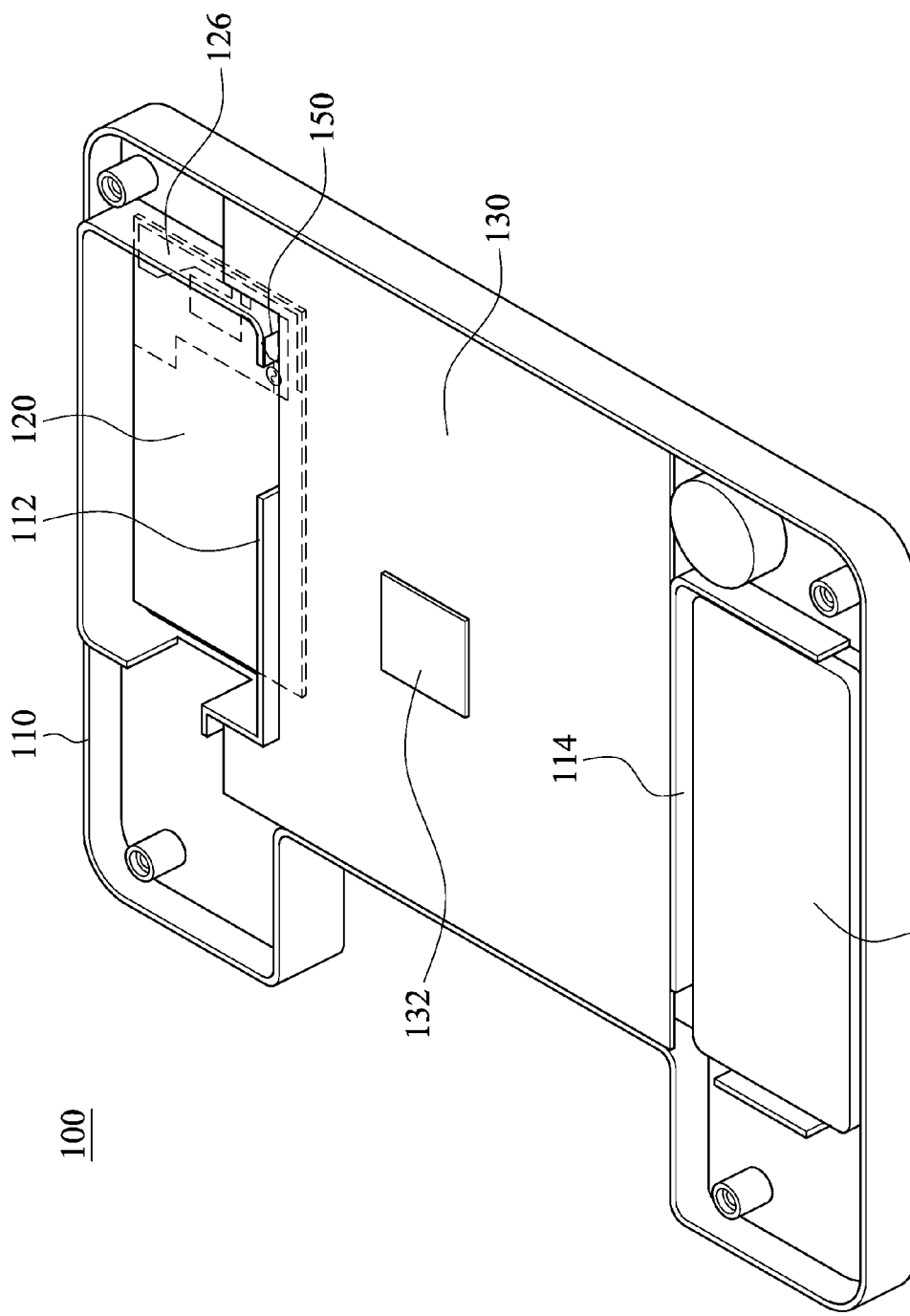
FIG. 7 is a pictorial drawing for illustrating a real product of the wireless security device according to an embodiment of the invention.

FIG. 7 is a pictorial drawing for illustrating a real product of the wireless security device 100 according to an embodiment of the invention. As shown in FIG. 7, the nonconductive housing 110 of the wireless security device 100 substantially has a U-shape. The wireless security device 100 may further comprise other electronic components, such as capacitors and metal traces.

Traditionally, since a wireless security device has many electronic components inside, the complex PCB (Printed Circuit Board) environment and reflection of electromagnetic waves usually degrade performance of antennas. The invention incorporates a metal reflector into a wireless security device, and this has at least the following benefits: (1) changing radiation pattern of an antenna such that main beam of the antenna is toward a free space, not absorbed by complex structures above and behind the antenna; (2) reducing electromagnetic waves which is reflected by metal components behind the antenna to improve radiation efficiency of the antenna (Note that reflected waves with different phases cause destructive interferences and have a bad impact on radiation efficiency of the antenna); and (3) rejecting EMI from the mother circuit board to improve sensitivity of the wireless security device.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A wireless security device, comprising:
    a nonconductive housing;
    a mother circuit board, disposed in the nonconductive housing, and comprising a processor;
    a wireless expansion card, disposed in the nonconductive housing, and comprising;
        a dielectric substrate;
        a ground plane, disposed on a surface of the dielectric substrate;
        an inverted-F antenna, disposed on the surface of the dielectric substrate, and coupled to the ground plane; and
        an RF (Radio Frequency) module, coupled to the inverted-F antenna, and coupled to the processor; and
    a metal reflector, positioned between the mother circuit board and the wireless expansion card, close to the inverted-F antenna, and configured to reduce EMI (Electromagnetic Interference) from the mother circuit board so as to maintain performance of the inverted-F antenna.

2. The wireless security device as claimed in claim 1, wherein the nonconductive housing comprises a nonconductive partition which separates the mother circuit board from the wireless expansion card, and the metal reflector is disposed on the nonconductive partition.

3. The wireless security device as claimed in claim 1, wherein a length of the metal reflector is greater than 0.5 wavelength of a central operating frequency of the inverted-F antenna.

4. The wireless security device as claimed in claim 1, wherein a distance between the metal reflector and the inverted-F antenna is approximately equal to 0.125 wavelength of a central operating frequency of the inverted-F antenna.

5. The wireless security device as claimed in claim 1, wherein the metal reflector substantially has an L-shape.

6. The wireless security device as claimed in claim 1, wherein the wireless expansion card is coupled through a parallel pin connector to the mother circuit board, and the parallel pin connector and the metal reflector substantially form a rectangular shape.

7. The wireless security device as claimed in claim 1, wherein the inverted-F antenna comprises:
    a taper element, having a narrow end and a wide end;
    a main branch, wherein one end of the main branch is coupled to the ground plane, and the other end of the main branch is coupled to the narrow end of the taper element;
    a feeding element, coupled to a side of the main branch, and coupled to a signal source; and
    an extension element, coupled to the side of the main branch,
    wherein the inverted-F antenna has a small hole which is surrounded by the main branch, the feeding element, and the extension element.

8. The wireless security device as claimed in claim 7, wherein the main branch substantially has an L-shape.

9. The wireless security device as claimed in claim 7, wherein the feeding element substantially has a triangular shape.

10. The wireless security device as claimed in claim 7, wherein the extension element substantially has a rectangular shape.

11. The wireless security device as claimed in claim 7, wherein the ground plane has a corner notch close to the taper element.

12. The wireless security device as claimed in claim 7, wherein the feeding element, a portion of the main branch, and the taper element are excited to form a first frequency band.

13. The wireless security device as claimed in claim 12, wherein the first frequency band is approximately from 880 MHz to 960 MHz.

14. The wireless security device as claimed in claim 7, wherein the feeding element and the extension element are excited to form a second frequency band.

15. The wireless security device as claimed in claim 14, wherein the second frequency band is approximately from 1710 MHz to 1880 MHz.

16. The wireless security device as claimed in claim 1, further comprising:
    a battery, coupled to the mother circuit board, wherein the mother circuit board is disposed between the battery and the wireless expansion card.

17. The wireless security device as claimed in claim 1, wherein the dielectric substrate has a dielectric constant of about 4.4 and has a thickness of about 1.6 mm.

* * * * *